United States Patent [19]
Long et al.

[11] Patent Number: 5,358,055
[45] Date of Patent: Oct. 25, 1994

[54] PARTIAL WIDTH SEEDING ATTACHMENT

[75] Inventors: John D. Long, Ankeny, Iowa;
Richard H. Clark, Geneseo, Ill.

[73] Assignee: Deere & Company, Moline, Ill.

[21] Appl. No.: 7,863

[22] Filed: Jan. 22, 1993

[51] Int. Cl.$^5$ .............................................. A01B 63/32
[52] U.S. Cl. ...................... 172/470; 91/530;
91/527; 111/922; 172/315; 172/453; 172/460;
172/400
[58] Field of Search ............... 172/2, 260.5, 310, 315,
172/316, 326, 327, 400, 407, 413, 452, 453, 464,
468, 471, 470, 456, 460; 111/55, 54, 52, 60, 62,
61; 91/527, 530

[56] References Cited
U.S. PATENT DOCUMENTS

| | | | |
|---|---|---|---|
| 2,587,750 | 6/1971 | Cantral | 91/527 |
| 3,627,059 | 12/1971 | Jackson | 172/413 |
| 3,736,988 | 6/1973 | Cantral et al. | 172/9 |
| 3,910,326 | 10/1975 | Tucek | 91/527 |
| 4,339,139 | 7/1982 | Swanson | 172/413 |
| 4,413,685 | 11/1983 | Gremelspcher . | |
| 4,487,106 | 12/1984 | Field, Jr. | 91/527 |
| 4,516,469 | 5/1985 | Sato et al. | 91/530 |
| 4,736,673 | 4/1988 | Harada et al. | 91/527 |
| 5,065,681 | 11/1991 | Hadley . | |

*Primary Examiner*—Randolph A. Reese
*Assistant Examiner*—Spencer Warnick

[57] ABSTRACT

A partial width seeding attachment includes electronically controlled solenoids which activate hydraulic flow control valves connected to the hydraulic cylinders on respective implement sections. Switches in the tractor cab control the rockshaft of one or more selected sections independently of the other sections to raise the openers on the selected section or sections from contact with the soil. An electronically activated flow reversing valve is connected between the source of hydraulic fluid under pressure and the lift cylinder for each of the sections. Activation of a selected valve after the selective control valve on the tractor is moved to the normal field working position pressurizes the side of the cylinder that raises the openers on the section. The remaining cylinders operate normally to maintain preselected down pressure on the other openers. A master raise switch provides implement lift independent of the position of the individual rockshaft control switches. A latching relay connected to a momentary on switch prevents valve operation without manual switch movement after a power interruption.

15 Claims, 2 Drawing Sheets

PARTIAL WIDTH SEEDING ATTACHMENT

BACKGROUND OF THE INVENTION

The present invention relates generally to agricultural implements such as grain drills or the like, and more specifically to structure for raising a selected portion of a plurality of ground engaging tools on such an implement while leaving the remaining tools in the normal ground working position.

The driving pattern farmers use to seed fields with implements such as grain drills varies widely. Some follow the outside perimeter with consecutive paths moving toward the center of the field and then over seeding of the diagonals of the field. Others seed straight paths followed by seeding of the headlands, a method which results in the problem of double seeding, especially when a field is irregularly shaped. Of course, the larger the drill, the larger the area that will be double seeded. Growing popularity of large drills has magnified the double seeding problems of seed costs and poor crop performance due to overpopulation of seeds.

Attempts to overcome the double seeding problems have included electronic control of drive clutch engagement to selectively disengage drive to meters which feed the openers that would otherwise be double seeding. One problem with selective drive clutch disengagement is that the openers remain in contact with the ground and disturb areas that have already been planted. Such contact increases opener wear and upsets the critical seed/soil environment which, in turn, can reduce yields.

In systems with down pressure regulation such as available on the John Deere 455 Series Folding Grain Drill and shown and described in U.S. Pat. No. 5,065,681, cylinders for controlling vertical tool movement and down pressure on the sections are connected in parallel. Heretofore there has been no convenient and inexpensive way to raise tools on one or more of the sections to avoid double seeding and disturbance of previously seeded areas.

BRIEF SUMMARY OF THE INVENTION

It is therefore an object of the present invention to provide an improved structure for an implement such as a multi-section grain drill or other implement with ground engaging tools to facilitate partial width operation while reducing or eliminating some or all of the above-mentioned problems. It is another object of the invention to provide such a structure which is very reliable, relatively simple in construction and easy to operate. It is still another object to provide such a structure which is particularly well suited for use with a regulated hydraulic down pressure system.

It is still a further object of the invention to provide an improved partial width seeding attachment for a grain drill or the like which reduces seed costs and improves crop performance. It is another object to provide such an attachment which increases the life of the openers and minimizes disturbance of previously seeded areas. It is yet another object to provide such an attachment which advantageously utilizes existing lift cylinders on the implement to raise selected openers from the ground, and which can be added to implements, including those implements with a regulated hydraulic down pressure system, without extensive or expensive modifications. It is still a further object to provide such a system which facilitates lifting of tools utilizing an electric switch.

A wide drill includes two or more drill sections, and each section includes openers that are raised and lowered by a rockshaft and a single hydraulic cylinder. A clutch disengages the seed meter drive on a section when the cylinder is operated to raise the openers. During field-working operations, the cylinder applies an adjustable down-pressure to the rockshaft and openers on the section. The partial width seeding attachment includes electronically controlled solenoids which activate hydraulic flow control valves connected to the hydraulic cylinders on the respective implement sections. The rockshaft of one or more selected sections can be controlled independently of the other sections from switches in the cab to raise and/or maintain the openers on the selected section or sections out of contact with the soil to increase the life of the openers, prevent disturbance of previously seeded areas in the field and reduce double seeding and overall seed requirements for a given area.

In one embodiment of the invention, an electronically activated flow reversing valve is connected between the source of hydraulic fluid under pressure and the lift cylinder for one or more of the sections. Activation of a valve pressurizes the side of the cylinder that raises the openers on the selected section and deactivates the clutch which disengages the seed meter drive for the section. The remaining cylinder or cylinders operate normally to maintain preselected down pressure on the other openers. To return to full width seeding, the valve is deactivated for normal oil flow which lowers the openers and engages the drive for the section. A master switch connected to a reversing valve for each implement section may be provided to raise the openers so that the tractor selective control valve can be left in the constant pressure field working mode during turns at the end of the field.

In another embodiment, electronically controlled valves are utilized to selectively block oil flow to and from a cylinder on a selected implement section. With the openers of all the sections lowered to the field working positions, the operator activates a selected valve or valves for the section or sections that are to continue to seed. The openers on the remaining sections are raised hydraulically to stop seeding while the selected section or sections remain fully operational in the lowered position. To return to full width seeding, the raised implement sections are lowered and the valve or valves are deenergized.

Both embodiments of the invention are relatively simple and inexpensive and easy to operate from a panel of switches in the tractor. The attachments are particularly useful with constant down pressure systems such as shown in the aforementioned U.S. Pat. No. 5,065,681.

These and other objects, features and advantages of the present invention will become apparent to one skilled in the art upon reading the following detailed description in view of the drawings.

DETAILED DESCRIPTION OF THE DRAWINGS

Figure 1:
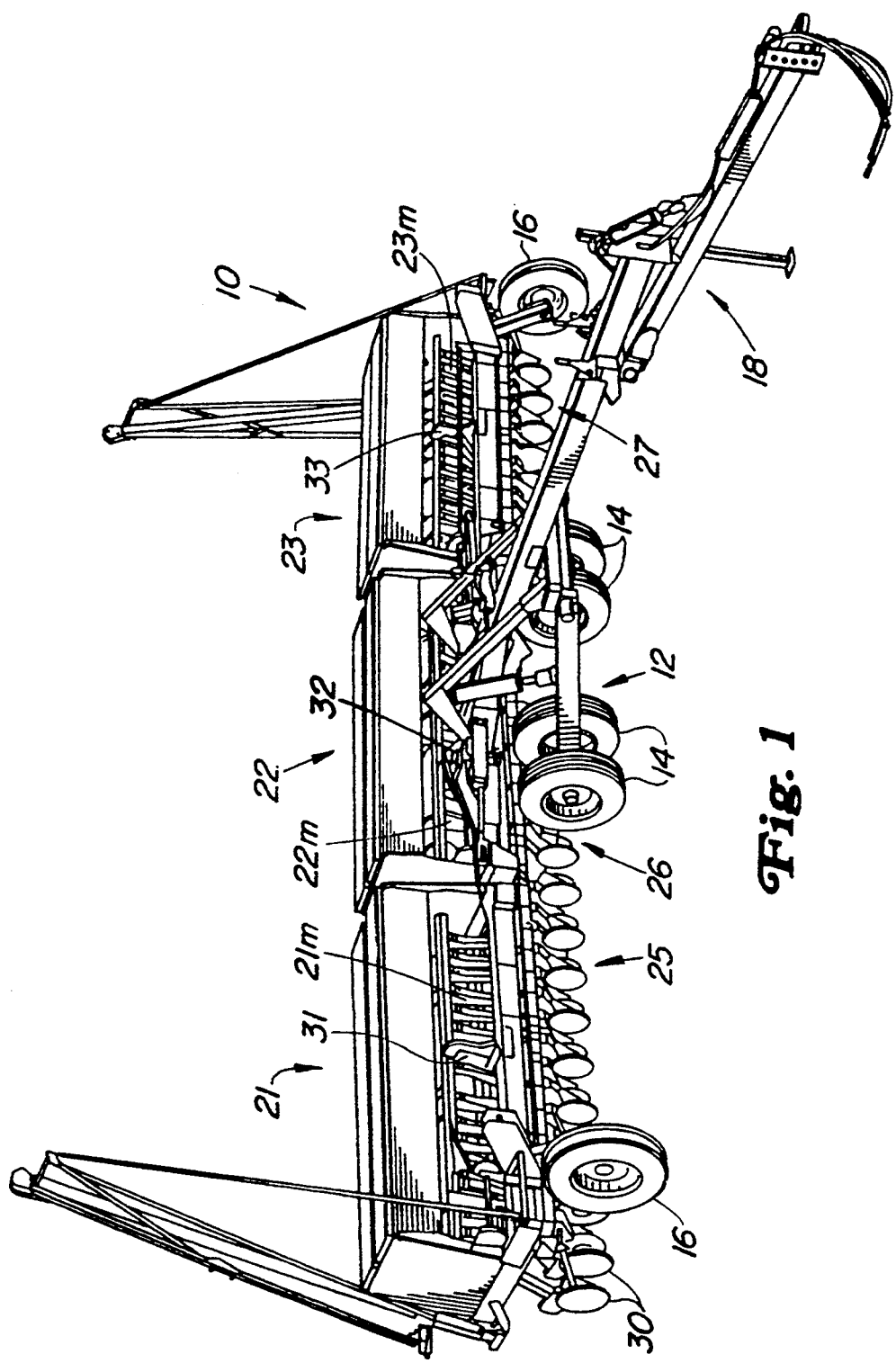
FIG. 1 is a perspective view of a multi-section implement with a hydraulic cylinder on each section for controlling vertical movement of earthworking tools.

Referring now to FIG. 1, therein is shown an implement 10, such as a multi-section grain drill, having frame structure 12 supported for forward movement over the ground by wheels 14—16. A hitch 18 connects the implement 10 with a towing vehicle such as a tractor (not shown).

Figure 2:
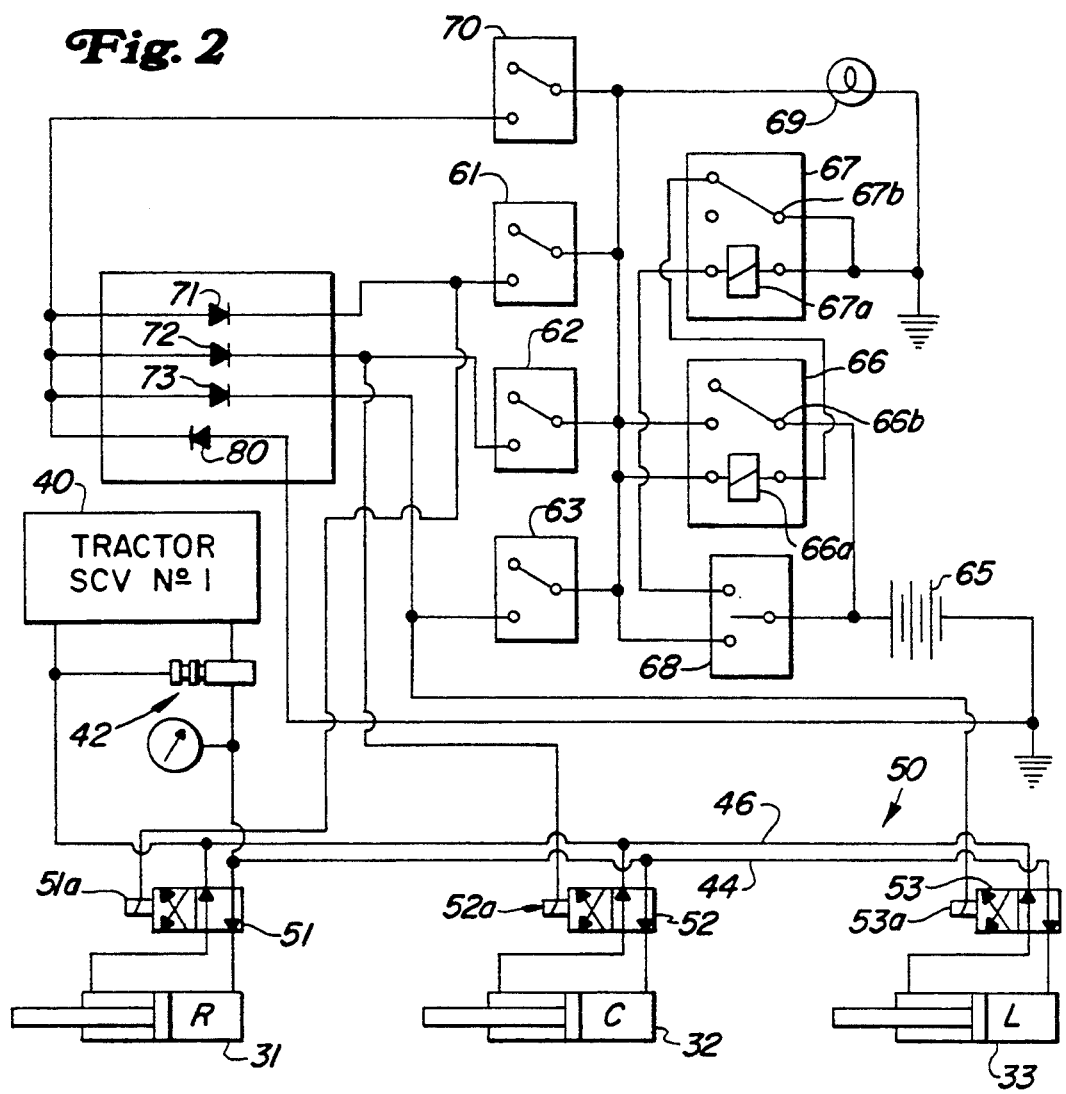
FIG. 2 is a schematic representation of the electrohydraulic control circuit utilized with the implement of FIG. 1.

The implement 10 includes first, second and third sections 21, 22 and 23 with sets 25, 26 and 27 of conventional ground engaging tools 30. Vertical movements of the sets 25, 26 and 27 between lowered ground working positions and raised transport positions are individually controlled by double acting cylinders 31, 32 and 33, respectively. The sets of tools 25, 26 and 27 are connected to rockshafts (not shown) supported for rocking with respect to the frame structure 12 about transversely extending axes by the cylinders 31, 32 and 33. The cylinders 31—33 are connected to a source of hydraulic fluid on the tractor through a conventional selective control valve (SCV) 40 (FIG. 2). A pressure regulator 42 is connected between the SCV 40 and the cylinders. The cylinders 31–33 are plumbed in parallel by a line 44 which normally is connected to the base end of the cylinders and by a line 46 which is normally connected to the rod end of the cylinders. Pressurizing the rod ends of the cylinders pivots the rockshafts to raise the tools 30. Pressurizing the base ends of the cylinders rocks the tools 30 to the lowered field-working positions and maintains a preselected average down pressure on the tools dependent on the setting of the regulator 42. The base end pressure and thus the down pressure on the tools 30 is determined by the control setting of the regulator 42. If further information is desired on the down pressure structure, reference may be had to the aforementioned U.S. Pat. No. 5,065,681 incorporated herein by reference.

The individual implement sections 21, 22 and 23 each include a conventional metering system (21m–23m of FIG. 1) with seed meters and a drive shaft controlled by a clutch (not shown) which automatically removes drive from the meters when the tools 30 on the section are raised toward the transport position. When the tools are lowered, the clutch automatically engages to drive the meters.

A partial width attachment, indicated generally at 50 in FIG. 2, includes reversing valves 51, 52 and 53 connected between the lines 44 and 46 and the cylinders 31–33. The valves 51–53 are four way, two position spool type valves and include solenoids 51a, 52a and 53a. The positions of the valves 51–53 when the solenoids are not activated are as shown in FIG. 1 of permit normal cylinder action under control of the SCV 40 for conventional raising and lowering of the tools 30 generally in unison across the width of the implement and for applying an adjustable and uniform average opener down pressure as described in U.S. Pat. No. 5,065,681.

Figure 3:
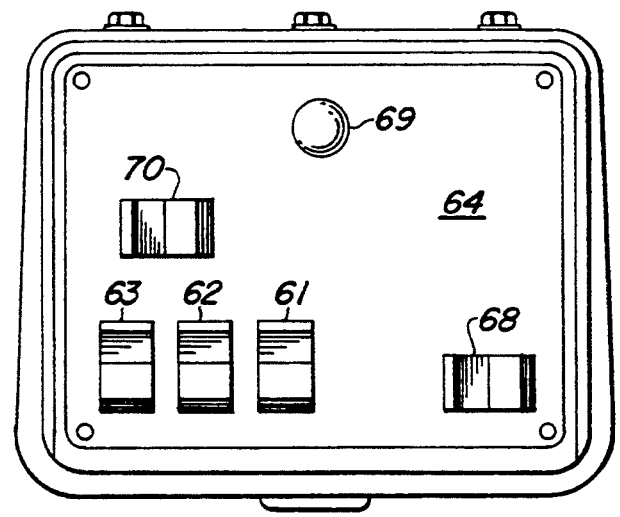
FIG. 3 is a view of the electrical control panel for the circuit of FIG. 2.

The solenoids 51a, 52a and 53a are connected to switches 61, 62 and 63, respectively, of a switch panel or control box 64 (FIG. 3) located in the tractor cab. The switches 61–63 are connected to a power supply 65 on the tractor through a latching relay 66 having a solenoid 66a and a solenoid-operated switch 66b. An additional relay 67 with a solenoid 67a includes a normally closed switch 67b connected between the solenoid 66a and ground.

A single pole, double throw master switch 68 is connected between the relays 66 and 67 and the power supply. The switch 68 is a momentary on rocker type switch with a lower output terminal connected to the switches 61-63 and to the relay solenoid 66a. The upper output terminal is connected to the solenoid 67a. When pushed to the lower on position, the switch 68 activates the solenoid 66a to close the switch 66b and bootstrap the relay to the on condition to supply power to the inputs of the switches 61, 61 and 63. If power is interrupted to the relay 66 or if the path to ground from the solenoid 66a through the relay 67 is opened by rocking the switch 68 up to the off position to open the switch 67b, the switch 66b opens. Once the switch 66b opens, the switch 68 must be operated before the relay 66 can again be bootstrapped on to supply power to the inputs of the switches 61-63. An indicator light 69 is connected between the relay output and ground to provide a power on indication when the control box 64 is turned on.

With the relay 66 latched in the on position, movement of the switch 61 to the closed position activates the solenoid 51a to move the valve 51 to the right from the position shown to reverse the normal flow of fluid to and from the cylinder 31. Movement of the switch 62 or 63 to the closed position activates the solenoid 52a or 53a to cause a similar reversal of the normal flow of fluid to and from the respective cylinder 32 or 33. Returning the switches 61-63 to the off positions deactivates the solenoids so that the valves 51, 52 and 53 return to the normal flow positions shown in FIG. 2 for conventional cylinder operation.

A master raise switch 70 is connected to the output of the relay 66, and to the solenoids 51a, 52a and 53a by blocking diodes 71, 72 and 73, respectively. A diode 80 is connected to the diodes 71-73 to limit negative spikes upon opening of any of the switches.

By closing the switch 70, all the solenoids 51a, 52a and 53a are activated to reverse flow to the cylinders and retract the cylinders to lift the tools from the ground, regardless of the position of the switches 61, 62 and 63. Therefore, with the control box 64 turned on, the operator can use the switch 70 to raise the tools, for example, at the end of the field during turns without having to operate the SCV 40 or reposition any of the switches 61-63. When the switch 70 is opened, the cylinders will return to their previous positions dependent on the state of the switches 61, 62 and 63.

In operation, with the solenoids 51a-53a deactivated and the tools 30 on all the implements sections 21-23 initially raised, the operator moves the SCV 40 to the normal field-working position wherein pressure is applied to line 44 to extend the cylinders 31-33 so that the tools are rocked into ground engagement with a regulated pressure applied to the base ends of the cylinders. When the operator desires to lift one set of the tools 25-27 from the ground and stop seed flow to that set, he activates the solenoid 51a, 52a or 53a for that section to reverse fluid flow and retract the cylinder. For example, if the operator desires to avoid double seeding on the right hand side, he moves the switch 61 to the up position to activate the solenoid 51a. The valve 51 moves to the right from the position shown in FIG. 2 so that pressure now applied to the rod end of the cylinder 31 retracts the cylinder and lifts the set 25 of tools of section 21 from the ground and seed flow to the set 25 terminates. To return to full width seeding, the solenoid 51a is deactivated by opening the switch 61. The valve 51 returns to the normal flow position shown in FIG. 2 to lower the openers on the section 31. If double seeding begins to occur on the left hand side of the implement 10, the solenoid 53a is activated to raise the tools on the section 23. For narrow seeding, two of the solenoids 51a-53a are activated to raise the corresponding two of the tool sets 25-27 and leave only one of the sections 21-23 operational. Any combination of sections can be selected for raising to most conveniently avoid double seeding for the particular field layout.

Figure 4:
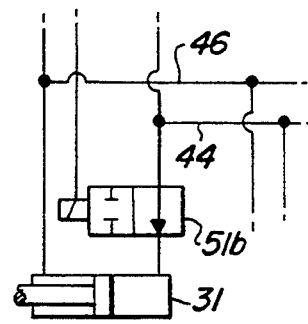
FIG. 4 shows an alternate embodiment of the invention utilizing blocking valves.

The reversing valves 51, 52 and 53 may be replaced with blocking valves (see 51b of FIG. 4) to selectively block oil flow to and from a the base end of the cylinder on a selected implement section utilizing the switches 61-63 (the master switch 70 is not present in this embodiment). With the openers of all the sections lowered to the field working positions, the operator activates the appropriate valve 51b to block the base end of the cylinder for the section that is to continue to seed. The openers on the remaining section or sections are raised hydraulically in conventional fashion to stop seeding while the selected section remains fully operational in the lowered position. To return to full width seeding, the raised opener sections are lowered and the valve 51b is deenergized for normal fluid flow to and from the cylinder.

Having described the preferred embodiment, it will become apparent that various modifications can be made without departing from the scope of the invention as defined in the accompanying claims.

We claim:

1. In an implement having a frame structure supported for movement forwardly over the ground by a tractor, and a plurality of tools connected to the frame structure for vertical movement with respect thereto between raised transport and lowered field-working positions, first and second hydraulic motors connected to first and second sets, respectively, of the tools, and a selective control connected between the motors and a source of hydraulic fluid under pressure on the tractor, the selective control positionable for normally raising and lowering respective first and second sets of the tools generally in unison, a partial width attachment comprising;

a remotely operable first valve connected between the source and the first hydraulic motor and a remotely operable second valve connected between the source and the second hydraulic motor; and control means for operating the first valve from a location remote from the first hydraulic motor to maintain first set of tools out of ground contact when the selective control is positioned to normally lower the tools to the field-working position, the control means including single switch means for operating the second valve in unison with the first valve for raising the implement from the ground-working position, and individual valve switches connected between a source of power and the remotely operable valves, and diodes connected between the single switch means and the valves for facilitating overriding of the individual valve switches by the single switch means.

2. In an implement having a frame supported for forward movement over the ground by a towing vehicle and a plurality of transversely spaced sets of tools connected to the frame for movement between raised transport and lowered field-working positions, including at least first and second two-way cylinders connected to, and for controlling vertical movement of, first and second sets, respectively, of the tools, and a movable selective control connected between the cylinders and a source of hydraulic fluid under pressure for normally raising and lowering respective first and second sets of the tools vertically in unison between transport and field working positions, a partial width attachment comprising:

a first remotely operable valve connected between the source and the first cylinder, and a second remotely operable valve connected between the source and the second cylinder, the valves operable for selectively reversing flow to the first and second cylinders to cause vertical movement of the first and second sets of tools opposite the in unison vertical movement;

manually operable switch means including a plurality of activatable switches connected to a power source and to the first and second valves for selectively controlling the first and second valves individually from the towing vehicle to selectively lift one set of tools to the transport position while the other set remains in the ground working position; and wherein the manually operable switch means includes means for preventing operation of the valves to reverse flow after power to the switch means is interrupted until the switch means is manually operated.

3. The invention as set forth in claim 2 including a third cylinder connected in parallel with the first and second cylinders for controlling vertical movement of a third set of tools, a third valve connected to the third cylinder, and wherein the manually operable switch means includes individual switches connected to the first, second and third valves for operating the valves to maintain one of the three sets of tools or a combination of the three sets of tools in the transport position when the selective control is positioned such that all the sets of tools would normally lower to the field working position.

4. The invention as set forth in claim 2 wherein the switch means includes first and second individual activatable switches for selectively operating the first and second valves individually and a third activatable switch for operating the valves in unison to raise the first and second sets of tools to the transport position when the selective control is positioned to normally maintain the tools in the ground working position.

5. The invention as set forth in claim 2 wherein the means for preventing operation comprises a switch connected to the source and to a latching relay.

6. In an implement having frame structure supported for movement forwardly over the ground by a tractor, and a plurality of tools connected to the frame structure for vertical movement with respect thereto between raised transport and lowered field-working positions, first and second hydraulic cylinders connected to first and second sets, respectively, of the tools, and a selective control valve (SCV) connected between the cylinders and a source of hydraulic fluid under pressure on the tractor, the SCV positionable for normally raising and lowering respective first and second sets of the tools generally vertically in unison, a partial width attachment comprising:

remotely operable first and second valves connected between the source and the first and second hydraulic cylinders, respectively;

and manually operable switch means connected to the valves and to a source of power on the tractor for operating the valves from a location remote from the cylinders to maintain one set of tools in ground contact and to raise the other set of tools to the raised transport position when the SCV is positioned to raise the tools, the switch means including first and second switches connected to the first and second valves, respectively, and means for preventing operation of the switch means to maintain one set of tools in ground contact when the SCV is positioned to raise the tools after power to the switch means is interrupted until the switch means is manually operated.

7. The invention as set forth in claim 6 wherein the valves comprise a reversing valve for reversing the normal flow of fluid to the first cylinder.

8. The invention as set forth in claim 6 wherein the valve comprise a blocking valve for selectively preventing operation of the first cylinder when the second motor is operated.

9. The invention as set forth in claim 7 further comprising pressure regulator means connected between the SCV and the reversing valve for providing an adjustable down pressure on the tools when the tools are in the lowered position.

10. The invention as set forth in claim 8 further comprising a pressure regulator connected between the SCV and the blocking valve.

11. The invention as set forth in claim 7 wherein the first and second hydraulic cylinders are normally connected in parallel with each other.

12. In an implement having a frame supported for forward movement over the ground by a towing vehicle, the towing vehicle having a power source, a plurality of transversely spaced sets of tools connected to the frame for movement between raised transport and lowered field-working positions, including at least first and second hydraulic motors connected to, and for controlling vertical movement of, first and second sets, respectively, of the tools, and a movable selective control connected between the motors and a source of hydraulic fluid under pressure for raising and lowering respective first and second sets of the tools generally in unison between transport and field working positions, a partial width attachment comprising:

a first valve connected between the source and the first motor and movable to a position for reversing flow to the first motor to cause vertical movement of the first set of tools opposite the vertical in unison movement;

means for controlling the valve from the towing vehicle to selectively lift one set of tools to the transport position while the other set remains in the ground working position with the adjustable down pressure provided;

a second valve connected to the second motor, the valve including means for reversing flow to the second motor;

wherein the first and second valves are electrically operated;

switch means including a plurality of activatable switches connected to a power source for selectively operating the valves from the towing vehicle, wherein the switches include first and second switches for selectively operating the first and second valves individually, and a third switch, and means connecting the third switch to the first and second valves for overriding the first and second switches and operating the valves in unison to raise the first and second sets of tools to the transport position when the selective control is positioned to maintain the tools in the ground working position.

13. The invention as set forth in claim 12 further including means for preventing operation of the valves to reverse flow to the motors after power to the switch means is interrupted until one of the plurality of switches is activated.

14. The invention as set forth in claim 13 wherein the means for preventing operation comprises a fourth switch connected to the source and to the third switch.

15. The invention as set forth in claim 12 including a pressure control connected between the selective control and the motors for providing an adjustable down pressure when the tools are in the ground working position.

* * * * *